J. R. GAMMETER.
METHOD OF MAKING GOLF BALLS.
APPLICATION FILED FEB. 25, 1914.
1,167,396.
Patented Jan. 11, 1916.
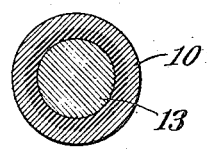
Fig.3
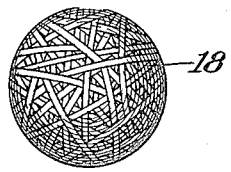
Fig.4
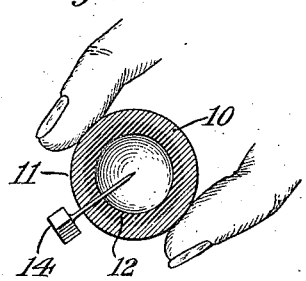
Fig.1
Fig.2
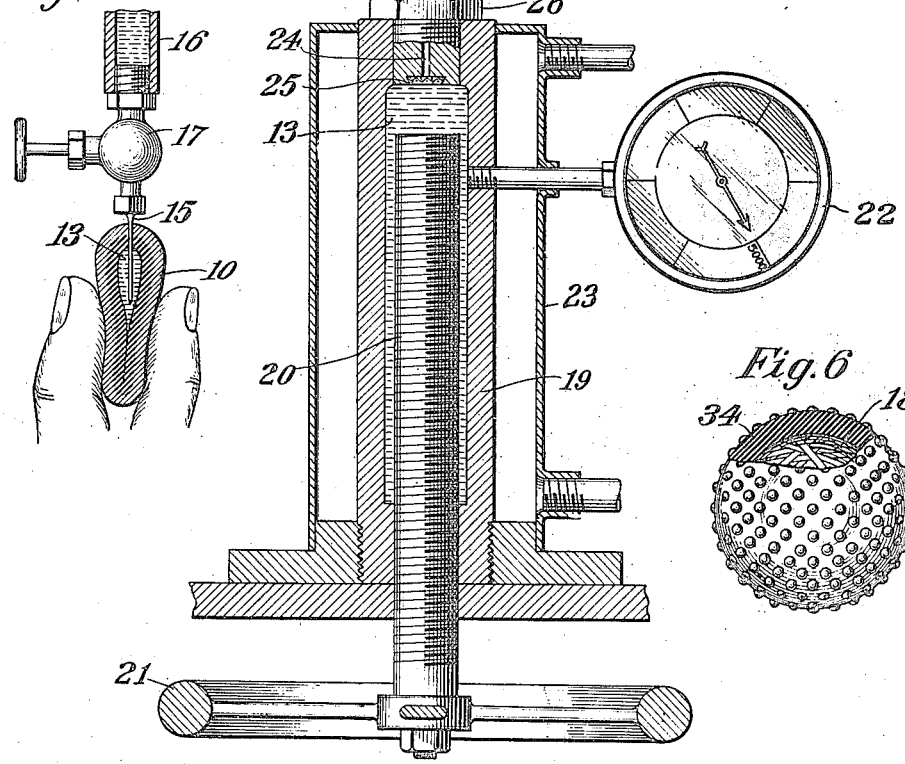
Fig.5
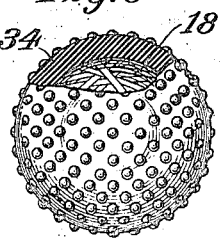
Fig.6
Witnesses:
George Lamson
Cora Williams
Inventor
J. R. Gammeter
By his Attorney
Robert M. Pierson

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD OF MAKING GOLF-BALLS.

1,167,396.  Specification of Letters Patent.  Patented Jan. 11, 1916.

Application filed February 25, 1914. Serial No. 820,899.

*To all whom it may concern:*

Be it known that I, JOHN R. GAMMETER, a citizen of the United States, residing at Akron, in the county of Summit and State of Ohio, have invented certain new and useful Improvements in Methods of Making Golf-Balls, of which the following is a specification.

This invention relates to the type of golf-ball described in patent to Work and Haskell, No. 622,834, comprising a core of rubber thread wound under high tension and inclosed in a shell of gutta-percha or equivalent substance.

My object is to secure a much higher tension in the rubber winding, and consequently increased distance of flight when the ball is struck, together with other qualities desirable in a golf ball, as compared with the results heretofore attained.

My invention is founded on the observation that when a vulcanized pure rubber band or strip is stretched to that point which, for the moment, represents its elastic limit, and is left in that condition for a substantial period (say twenty-four hours) it may then be further stretched to a considerable degree. Consequently when a golf-ball core is wound in the ordinary way to what seems nearly the elastic limit of the thread and is then provided with its gutta-percha cover, or even if wound to a fairly high tension and then given additional tension by the injection of fluid into its center before applying the cover, but without pursuing the steps necessary to impart to the rubber thread what I herein term "super-tension," the rubber will not actually be stretched as far as it is capable of being, and the finished ball will not give the results realized by my present invention. So far as I am aware, this property of rubber has never before been utilized in the manufacture of golf-balls. My improved product may be termed a super-tensioned ball or core, and in order to obtain it, certain necessary or desirable modes of procedure are adopted which I will now proceed to describe.

Of the accompanying drawing, Figure 1 represents a sectional view showing the mode of exhausting air from the central hollow sphere or envelop. Fig. 2 represents a sectional view of this envelop collapsed and receiving its initial injection. Fig. 3 represents a sectional view of the injected sphere. Fig. 4 represents an elevation of the same wound with rubber thread or tape. Fig. 5 represents a sectional view of the apparatus for making the final or super-tensioning injection. Fig. 6 represents a view of the completed ball, partly in section.

The central hollow sphere or envelop 10 on which the tensioned rubber thread is to be wound is of a nature suited to receive an injection of material in a fluid or plastic condition and to permanently retain its contents under very high pressure. It has an outer wall 11 of vulcanized rubber, and a lining 12 of self-sealing material such as raw rubber.

The injected material 13 should possess or be capable of assuming a degree of fluidity which will permit it to enter through a very small orifice such as that of a hypodermic needle in order to leave only a small wound in the envelop and the winding when the injecting tool is withdrawn, and it should preferably be capable of stiffening or solidifying to an extent which will prevent its escape under the enormous pressure which is employed. It is also desirable that it should be sufficiently yielding to allow of considerable deformation of the entire ball when full strokes are used in playing with it. I prefer to use what is known as printing-roller composition for this purpose, the principal ingredients of which are glue and molasses, but any other suitable material may be employed. It is desirable to have the central envelop 10 filled with this composition before winding it. The air may be removed by piercing the envelop with a hypodermic needle 14 as represented in Fig. 1 and then collapsing it with the fingers. The needle is then withdrawn and while the envelop is still collapsed, it is forced on the needle 15 of the initial injecting device. The initial injection may be made by the same apparatus which is used for final injection (shown in Fig. 5) or it may be made in any suitable way, substantially as represented in Fig. 2, 16 being a pipe or cylinder having a plunger (not shown) or connected with a source of pressure, for causing the material 13 to flow into the interior of sphere 10, the latter being allowed to assume spherical form as it becomes charged. The material is heated by suitable means to maintain it in a fluid condition and is shut off by means of a hand-valve 17 when the sphere is full. This central core section, charged with the injected material 13 as represented in Fig. 3 is then wound with vulcanized pure-rubber tape or thread 18 in the ordinary way, either by hand or machine, and then has the appearance represented in Fig. 4. I prefer to use rubber tape to decrease the number of interstices, but a final winding of narrower thread (not shown) may be applied for better union with the gutta-percha cover. The tension of this winding should preferably be carried, as it now is in making the ordinary rubber-cored balls, nearly to the point which, for the moment, represents the elastic limit of the thread. I have established the fact that a plastic-centered rubber wound core of the ordinary type will, when in its playing condition, have an internal pressure of about 1200 lbs. per square inch, and this is substantially the standard pressure, and after 24 hours' standing I find that the rubber will stretch about 10 to 15 per cent., beyond its original elastic limit. If then stretched by this amount and again allowed to stand for a like period, the rubber will stretch still farther, so that I could, after the second injection, attain a further degree of super-tension, and so on, but one injection of the wound core will yield a very good result. The amount of super-stretching obtainable depends somewhat on the condition and mode of preparation of the rubber thread, and a very high quality of thread will super-stretch less than others, but most thread will give about 10 to 15 per cent. additional length when allowed to stand for the period mentioned.

The super-stretching injection may be made with any suitable apparatus capable of imparting an internal pressure up to 5,000 lbs. per square inch or thereabout, which is substantially the maximum pressure which I find it practicable and desirable to employ, although not limiting myself to a particular pressure. Fig. 5 represents an apparatus which I have successfully employed, 19 being a cylinder for the injecting material 13, which is preferably the same material as used for the first injection 20 being a screw plunger provided with a hand-wheel 21, 22 a pressure gage, and 23 a water-jacket for the circulation of warm water to maintain the injecting material in a fluid or semi-fluid condition. 24 is an outlet from the cylinder, provided with a screen 25, and formed in a plug 26 having a threaded projection 27. The wound core, the hypodermic needle 28, and the controlling valve 29 are carried by a yoke or bracket 30 having an adjustable core-rest 31 and a threaded coupling member 32 for attachment to the outlet-projection 27.

The rest 30 being withdrawn, the core is forced onto the needle 28 by screwing inwardly on the threaded stem 33 of said rest, and the yoke 30 is coupled with the projection 27. Valve 29 being opened, the plunger 20 is then screwed inwardly by means of hand-wheel 21, and the distending material forced through needle 28 into the center of the core until the desired pressure, as indicated by gage 22 has been reached, the rubber threads 18 being thereby stretched substantially to a new elastic limit. The injecting fluid is then allowed to set or stiffen, before withdrawing the needle, so that it will not escape when said needle is removed, and it will be apparent that, owing to the enormous pressure, it would even then escape through anything but the smallest orifice, and that such orifice in the wall of the inner sphere 10 must be efficiently sealed (as by the lining of raw rubber 12) and should be completely covered (rather than merely surrounded) by the winding of rubber thread, whose courses to a certain extent lap over and substantially efface the passage of the needle through the winding, after the needle is withdrawn. Artificial cooling or "freezing" of the injected core hastens the setting of the injected material 13. The employment of the yoke 30 and its attachments permits the removal of the injected core from the cylinder 19 (by unscrewing the coupling 27, 32) while the needle is still in the core, and its replacement by another yoke and a core to be injected.

The foregoing steps and expedients may be variously modified without departing from my invention.

After the needle has been withdrawn, the injected core is provided with a cover 34 of gutta-percha or any suitable substitute, the completed ball being represented in Fig. 6.

The maximum injecting pressure employed, as shown by a gage anterior to the needle, depends upon the degree of fluidity of the injecting material, the size of the needle passage, and the thickness of the wall of rubber envelop 10 and rubber winding 18 (more especially the latter) relatively to the diameter of the cavity in said envelop. Materials which are relatively stiff or pasty require more force to inject them than those which are more fluid, and a small needle creates a greater resistance than a larger one. The needle resistances which I have observed vary from 100 to 200 pounds per square inch, and are determined by noting the gage reading when the material is freely extruded. This resistance pressure should be subtracted from the gage reading to get the true pressure in the ball when the flow is inward, as in injecting the ball, and added when the flow is outward as in testing the pressure in a ball.

The gage pressure shown by a freshly-injected ball or core is considerably higher than it shows after several hours, this being due to the relaxing property of the rubber mentioned above. Such relaxing however is not a further stretching and is not accompanied by any perceptible increase in diameter. The rubber thread having once been super-tensioned as described, thereafter remains less stretchable under impact, and the ball consequently tends to recover its shape and rebound from the club more quickly when struck. The result is a longer flight with a full blow of given force.

It is obviously important that the filling material should be wholly or largely of a permanently-mobile nature as distinguished from substances like gutta-percha which harden when cold, in order that the pressures of impact and recovery may be freely transmitted between all portions of the rubber winding, but any of the usual expedients may be employed in order to load or weight the core.

I claim:

1. The process of making a golf-ball core which consists in winding the core with rubber thread stretched nearly to the breaking point, allowing the thread to relax, and then injecting and stretching the rubber-wound core.

2. The process of making a golf-ball core which consists in winding rubber thread under high tension over a central body of permanently-mobile material, allowing said thread to relax, and then injecting further mobile material into the central body.

3. The process of making a golf-ball core which consists in winding rubber thread substantially to its temporary elastic limit over a central envelop, and then, after a substantial interval, injecting said envelop to further stretch said winding.

4. The process of making a golf-ball core which consists in winding the core with rubber thread stretched nearly to its temporary elastic limit, hypodermically injecting said core to further stretch said winding, causing the injecting material to set while the injecting instrument is still in place, and finally withdrawing the injecting instrument.

5. The process of making a golf-ball core which consists in piecing a hollow soft-rubber envelop to make a vent and collapsing it to exhaust the air through said vent, injecting the exhausted envelop with mobile material, winding said envelop with rubber thread under high tension, and then, after a substantial interval, again injecting said envelop with mobile material to further stretch the winding.

In testimony where I have hereunto set my hand in the presence of two subscribing witnesses, this 31 day of January, 1914.

JOHN R. GAMMETER.

Witnesses:
R. M. PIERSON,
CORA WILLIAMS.